Figure 1:
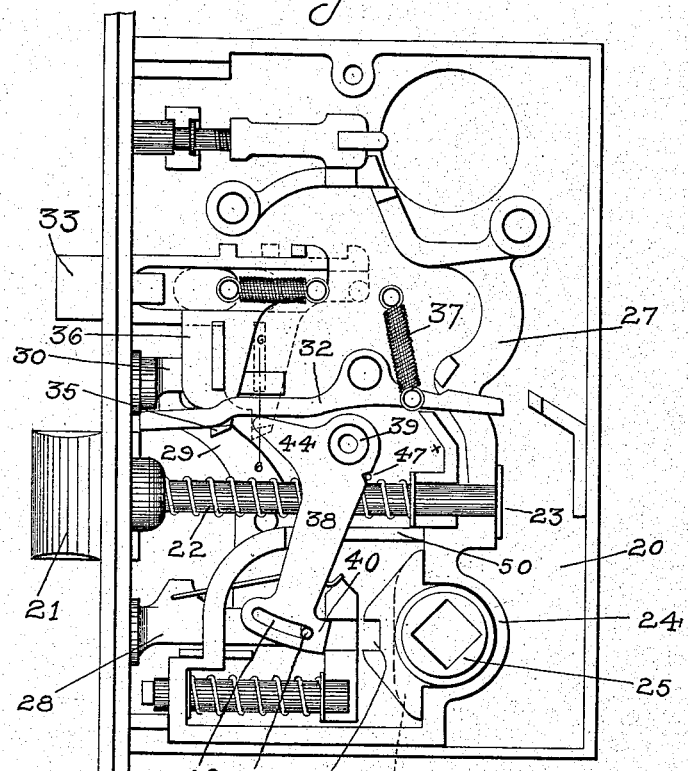

J. H. SHAW.
LOCK.
APPLICATION FILED DEC. 31, 1912.

1,171,264.

Patented Feb. 8, 1916.
3 SHEETS—SHEET 1.

WITNESSES:
F. A. Carlson
M. Olive Williams

INVENTOR:
John H. Shaw,
BY
Bacon & Fisher
ATTORNEYS.

J. H. SHAW.
LOCK.
APPLICATION FILED DEC. 31, 1912.

1,171,264. Patented Feb. 8, 1916.
3 SHEETS—SHEET 2.

WITNESSES:
F. A. Carlson
M. Olive Williams

INVENTOR:
J. H. Shaw

ATTORNEYS.

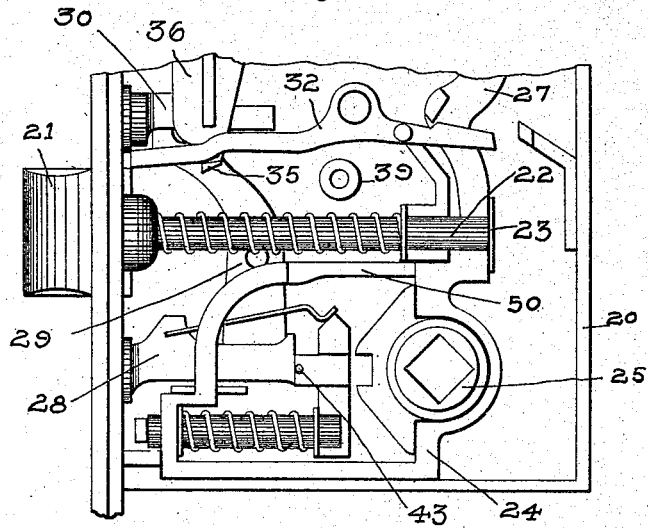
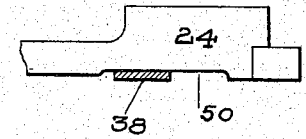
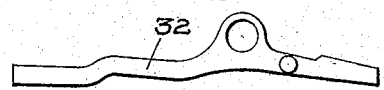
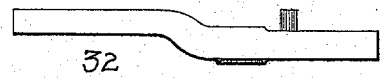
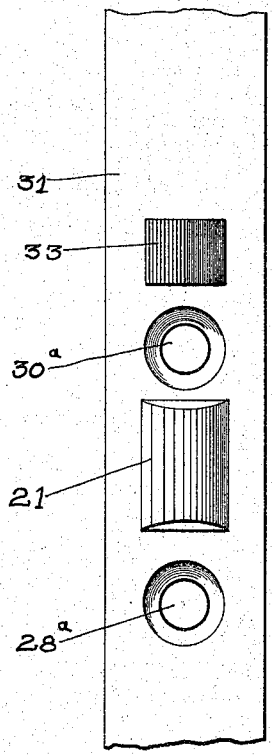
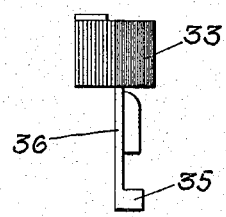

UNITED STATES PATENT (

JOHN H. SHAW, OF NEW HAVEN, CONNECTICUT, ASSIGNOR TO SA
OF NEW HAVEN, CONNECTICUT, A CORPORATION OF CO:

LOCK.

1,171,264.   Specification of Letters Patent.   Pat

Application filed December 31, 1912.   Serial No. 739,498.

*To all whom it may concern:*

Be it known that I, JOHN H. SHAW, a citizen of the United States, residing in New Haven, county of New Haven, State of Connecticut, have invented certain new and useful Improvements in Locks, of which the following is a full, clear, and exact description.

This invention relates to locks, and more particularly to locks having a latch bolt retractable by inner and outer manual retracting devices, and provided with stop work, or night latch mechanism, for dogging the outer retracting device. In some instances, locks of this character have been successfully attacked by throwing off the night latch mechanism by means of a thin blade or wire inserted between the jamb and the face plate. If the releasing slide of the night latch mechanism, or stop work, can be pushed in in this manner by a burglar or sneak thief, the door can be immediately opened without further difficulty, by manipulation of the outer knob. According to my present invention, I propose to overcome this drawback by providing means automatically operated by the closing of the door to dog the outer hub, or its equivalent, in a direct manner independently of the dogging action of the night latch mechanism, so that the outer knob, or other latch retracting device, will be directly and firmly blocked against operation, and maintained in this condition, irrespective of the actuation of the night latch mechanism. In other words, I provide means auxiliary to the night latch mechanism to dog the outer hub independently, which means cannot be rendered inoperative, when the door is closed, by the manipulation of the night latch mechanism, or other possible method of attack, from the face of the lock. The device for dogging the outer hub independently of the night latch mechanism is housed entirely within the lock case, and when it is in the operative dogging position it is practically impossible to release it while the door is closed. It is also proposed to furnish a lock in which the auxiliary dogging member will be automatically operated to dog the outer retracting device only when such operation is desired, means being provided for holding said dogging device in the inoperative position when it is desired to have the door freely openable by manipulation of the outside knob. More p: to have the auxiliary controlled in such a m night latch mechanism tive or inoperative at other words, when th nism is "off," the auxi nism will be inoperat the door, but when it mechanism will be a( by the closing of the c hub, or its equivalent, night latch mechanism To these and other consists in the novel f tions of parts to be and claimed.

Figure 11:
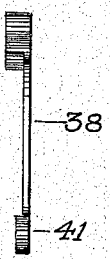
Figure 6:
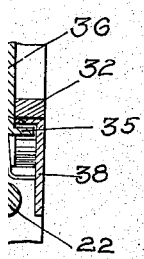
Figure 3:
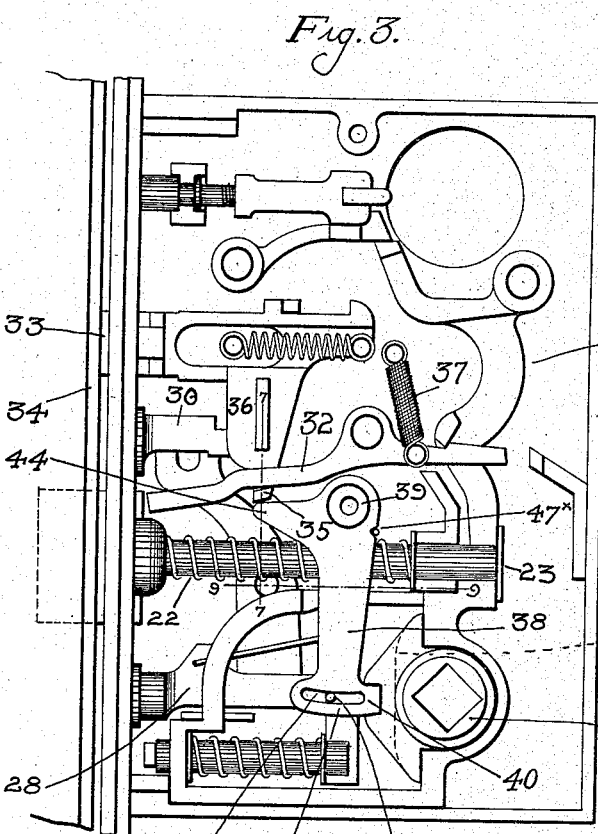

In the accompanyin is a front elevation of improvements, with t parts being in the po: sume when the door is latch mechanism is rel( lar view of the lower shown in Fig. 1, with t nism in its operative view similar to Fig. tion of the parts when anism is on, and the d( a view of the lower p showing the night latcl by means of an instrur the face plate, or fr Fig. 5 is a view of the 1, with the auxiliary moved, Fig. 6 is a se( Fig. 1, with the conti shown in dotted lines, line 7—7 of Fig. 3, Fi view of the face of th( tail section on line 9— tain parts omitted, Fi elevation of the auxili Fig. 11 is a detail ed Figs. 12 and 13 are fa spectively of the lat lever, and Fig. 14 is a the controller.

Referring to the dr lock case of usual for ary latch bolt 21, the provided with a cros: the ordinary manner v ing yoke 24. The yok by means of an outer hub 26, operated by the usual knobs (not shown). In the form shown, the latch bolt 21 may also be actuated by means of a lever 27 engaged with the cross-head 23 and adapted to be operated by suitable key mechanism, which it is not necessary to illustrate. The outer knob may be dogged by means of night latch mechanism coöperating with the outer hub 25, and comprising the usual dogging slide 28, walking beam 29, and releasing slide 30, the slides 28 and 30 being provided with push button heads 28ª and 30ª respectively, projecting through the face plate 31, as shown in Fig. 8. When the door is closed, the latch bolt 21 is automatically deadlocked in the customary manner by means of a deadlocking lever 32, controlled by a guard bolt or controller 33, projecting through the face plate and adapted to be pressed inward by contact with the strike 34, as shown in Fig. 3. As the controller is forced inward by contact with the strike, a lug or hook 35 carried by a depending plate 36 (which engages the lower edge of the lever 32 and normally holds said lever out of the path of the latch bolt) is moved rearwardly to permit the lever 32 to be swung into deadlocking position by means of a spring 37.

All of the parts so far described are old and well-known and form, in themselves, no part of my present invention.

Figure 10:
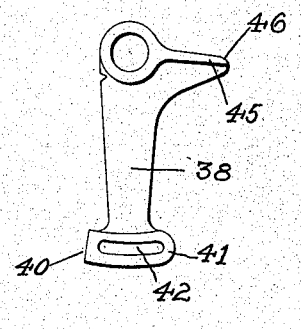

In accordance with my invention, I provide means for dogging the outer hub 25 independently of the dogging action of the night latch slide 28, or its equivalent. This additional, or auxiliary dogging means, may take the form of a lever 38 pivoted in the case at 39, and having at its free end a lug 40 adapted to dog the outer hub by entering the customary notch 25ª with which the latter is provided. The lever 38 may be arranged above the yoke 24 and night latch slide 28, as shown, so as to lie immediately beneath the cap plate. The shank of the lever 38 operates in a notch or cut-away portion 50 of the yoke, as shown more particularly in Fig. 9. In the embodiment illustrated, the free end of the lever is provided adjacent the lug 40 with an enlargement or head 41 overlying the slide 28, and provided with an elongated slot 42 engaged by a pin 43 on said slide, for the purpose which will presently appear. Adjacent the pivot 39, the lever 38 is provided with a laterally projecting arm 44 having an inwardly turned flange or lip 45 adapted to take over or under the controller lug or hook 35 when the controller is pressed inward, according to the angular position in which the dogging lever is placed. The extremity of the arm 44, having the flange 35, is rounded off at its upper part, as shown at 46, in Fig. 10, and the lower surface of the lug is beveled off to coöperate with the portion 46, in the manner presently explained. The auxiliary dogging member 38 is normally held out of engagement with the hub 25 by means, such as a spring 47, which urges the lever toward the left as far as is permitted by the pin 43 in the slot 42. The spring 47 may be conveniently formed of a coil of spring wire embracing the post 39 on which the lever 38 is pivoted, and having an end portion 47ˣ engaged in small notch at the edge of the lever.

Figure 2:
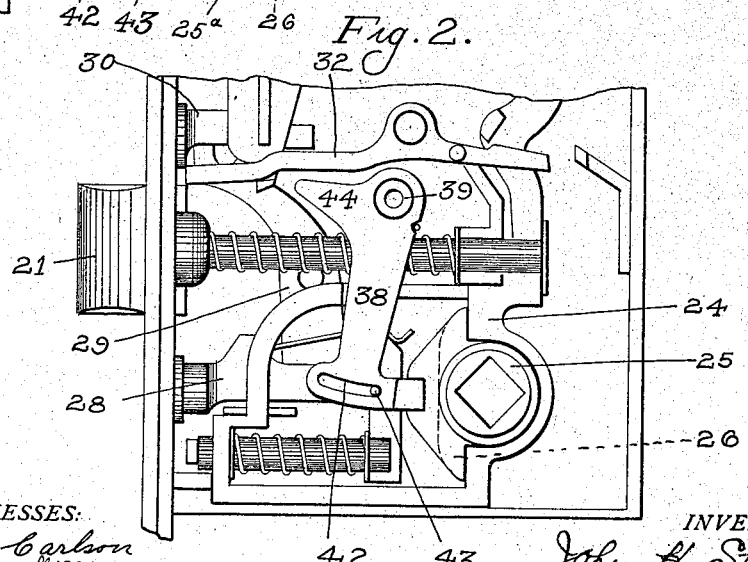
Figure 7:
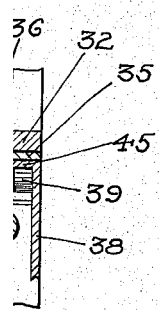
Figure 4:
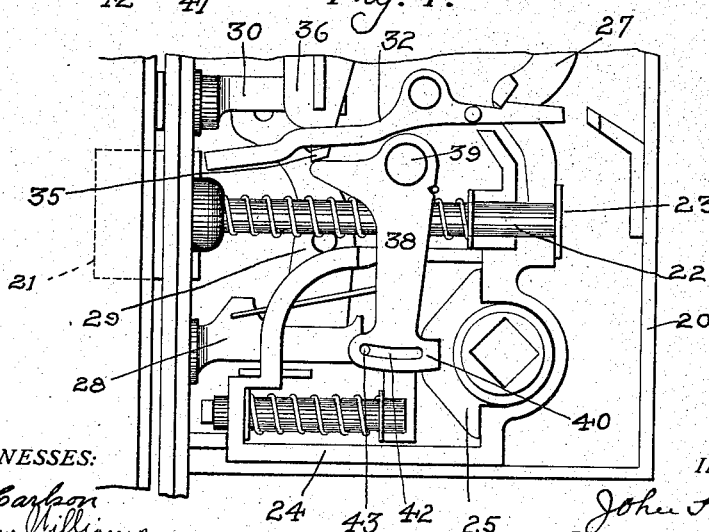

When the door is open and the night latch mechanism is off, the parts will have the position shown in Fig. 1. On closing the door, the controller 33 will be forced inward by the strike to deadlock the latch bolt, as hereinbefore described, and as the controller is moved inward its lug or hook 35 will pass freely beneath the flange or lip 45 of the member 38 without affecting the latter in any particular. Supposing that the door is again opened for the purpose of blocking the outer knob, the dogging slide 28 may be readily pushed in to engage the hub 25 in the usual manner. This inward movement of the slide 28 will carry the main portion of the lever 38 to the right by the engagement of the pin 43 with the right-hand end of the slot 42. This new position of the auxiliary dogging lever, as the slide 28 is engaged with the outer hub, is shown in Fig. 2. If the door is now closed, the extremity of the arm 44 of the lever 38 will be in such a position as to lie in the path of the inwardly moving controller lug 35. The beveled lower surface of the lug 35 engages the rounded nose portion 46, and pushes the arm 44 downward until the lug 40 is snugly engaged with the notch of the outer hub, as shown in Fig. 3. The parts are so arranged that when the controller is at the limit of its inward movement, the lug 40 will be sufficiently engaged with the notch 25ª to dog the outer hub in an effective manner, and the lever 38 will be held in its dogging position by the controller, as long as the door is closed. Supposing that a burglar or crook succeeds in throwing off the night latch mechanism by pressing inward the releasing slide 30, as shown in Fig. 4, the dogging member 38 will still be effective to dog the outer knob, and the attack on the lock will be thwarted. Inasmuch as it is impossible for the burglar, in the ordinary course of events, to release the controller 33, while the door is closed, the auxiliary dogging means for the outer retracting device will be safe from attack. The member 38 is housed wholly within the lock case, and it cannot be released from dogging position except by an outward movement of the controller which, of course, is effectively prevented by the strike. Supposing that the parts are in the position shown in Fig. 3, the door may be opened by manipulation of the inside hub, or by the insertion of a proper key into the lock from the outside, and the night latch mechanism may then be released in the usual way by pushing in the releasing slide 30. This will permit the spring 47 to shift the dogging member 38 out of engagement with the outer hub, and as the door is again closed, the incursion of the controller will have no effect on said dogging member, for the reason previously explained. The auxiliary dogging member is normally held in the inoperative position by the spring 47, or its equivalent, and the connection of said member with the night latch mechanism is only useful in limiting the releasing movement of said member, and in moving said member into a position wherein it will be operatively engaged with the controller when such is desired. When the auxiliary dogging member is in the fully released position of Fig. 1, the extremity of the arm 44 will be confined between the controller lug 35 and the shank of the deadlocking lever 32, when the controller is pressed inward, as shown in Fig. 6, but when the dogging member is held in its operative position, as shown in Fig. 3, the lug 35 will lie between the lever 32 and the arm 44, as shown in Fig. 7.

Many modifications of the construction may be adopted within the scope of the invention as defined in the claims.

What I claim is:

1. In a lock, a latch bolt, manual retracting means therefor including a hub, night latch mechanism for dogging said hub, and an additional or auxiliary dogging means for said hub operated automatically by the closing of the door to engage said hub and thereby prevent the rotation thereof; substantially as described.

2. In a lock, a latch bolt, manual retracting means therefor including a hub, a night latch slide for dogging said hub accessible at the face of the lock case, and an additional or auxiliary dogging means for said hub operated automatically by the closing of the door to engage and block said hub; substantially as described.

3. In a lock, a latch bolt, manual retracting means therefor including inner and outer hubs, night latch mechanism associated with the outer hub and comprising dogging and releasing slides, and an additional or auxiliary dogging device for the outer hub operated automatically by the closing of the door; substantially as described.

4. In a lock, a latch bolt, a retracting hub therefor, and means operated automatically on the closing of the door to engage and dog said hub; substantially as described.

5. In a lock, a latch bolt, a hub for retracting the same, a lever for directly engaging said hub, and means to actuate said lever automatically on the closing of the door; substantially as described.

6. In a lock, a latch bolt, a retracting hub therefor having a notch, a lever to engage said notch, and means for operating said lever automatically on the closing of the door; substantially as described.

7. In a lock, a case, a latch bolt therein, means within the case, and including a hub, to retract said latch bolt, a member within the case to dog said hub directly, and a normally projecting controller arranged to engage and operate said dogging member as said controller is pressed in by contact with the strike, substantially as described.

8. In a lock, a case, a latch bolt therein, a hub for retracting said latch bolt, a lever pivoted within the case and engageable with said hub to dog the latter, and a controller which moves said lever into dogging position as the door is closed; substantially as described.

9. In a lock, a latch bolt, a deadlocking device therefor, a retracting member for said latch bolt, and means to dog both the latch bolt and the retracting member directly on the closing of the door; substantially as described.

10. In a lock, a latch bolt, a deadlocking lever therefor, a controller for said lever, a hub for retracting said bolt, and a device operable by said controller for dogging said hub as the door is closed; substantially as described.

11. In a lock, a case, a latch bolt therein, a device within the case for retracting the latch bolt manually, a member within the case for dogging said retracting device, a spring normally holding said member in an inoperative position, and a projecting controller to actuate said member in opposition to said spring; substantially as described.

12. In a lock, a case, a latch bolt therein, a device within the case for retracting said latch bolt manually, a pivoted lever in the case to dog said device, yieldingly held in an inoperative position, and a projecting controller to operate said lever as the door is closed; substantially as described.

13. In a lock, a latch bolt, a retracting device therefor, a dogging member for said device, a controller to actuate said member automatically when the door is closed, and means to move said member out of coöperation with said controller; substantially as described.

14. In a lock, a latch bolt, a retracting device therefor, a dogging member for said device, a controller to engage and actuate said member, and means to move said member out of the path of said controller; substantially as described.

15. In a lock, a latch bolt, a retracting device therefor, a dogging member for said retracting device, means to actuate said dogging member, means normally holding said member out of coöperation with said last named means, and means to move said member into coöperation with said actuating means; substantially as described.

16. In a lock, a latch bolt, a retracting device therefor, a dogging member for said retracting device, a controller to actuate said dogging member, a spring normally holding said member out of coöperation with said controller, and means to move said member into coöperation with said controller; substantially as described.

17. In a lock, a latch bolt, a retracting device therefor, a dogging member for said retracting device, a controller to actuate said dogging member, a spring normally holding said member out of coöperation with said controller, and a night latch member to move said dogging member into coöperation with said controller; substantially as described.

18. In a lock, a latch bolt, a retracting device therefor, a dogging member for said retracting device, a projecting sliding controller to engage and operate said dogging member, means normally holding said dogging member out of the path of said controller, and manually operated means accessible at the exterior of the lock to move said member into the path of said controller; substantially as described.

19. In a lock, a latch bolt, a retracting device therefor, dogging means for said retracting device, deadlocking means for said latch bolt, and a single device to operate said dogging means and said deadlocking means; substantially as described.

20. In a lock, a latch bolt, a retracting device therefor, dogging means for said retracting device, deadlocking means for said latch bolt, and a controller to operate said dogging means and said deadlocking means; substantially as described.

21. In a lock, a latch bolt, retracting means therefor, means to dog said retracting means, means to actuate said dogging means, and a second dogging means for said retracting means operable to render the first dogging means operative or inoperative by its actuating means; substantially as described.

22. In a lock, a latch bolt, a retracting device therefor, a member to dog said device, means to operate said member automatically as the door is closed, and means for moving said member into and out of coöperative relation with said operating means; substantially as described.

23. In a lock, a latch bolt, a retracting hub therefor, a night latch member to engage said hub, an auxiliary dogging member to engage said hub, means to actuate said dogging member automatically as the door is closed, and means of connection between said night latch member and said dogging member to control the operation of the latter by its actuating means; substantially as described.

24. In a lock, a latch bolt, a retracting hub having a notch, a pivoted lever having a lug to engage said notch and a projecting arm, and a projecting controller having means to engage said arm, and thereby actuate said lever as the controller is moved inward by contact with the strike; substantially as described.

25. In a lock, a latch bolt, a device tending to deadlock said latch bolt, retracting means for said latch bolt, means to dog said retracting means, and means controlling the operation of said deadlocking device, constructed and arranged to actuate said dogging means; substantially as described.

26. In a lock, a latch bolt, manual retracting means therefor, including a hub, stop work to dog said hub, and an auxiliary dogging means for said hub operated automatically by the closing of the door to engage said hub and dog it directly; substantially as described.

27. In a lock, a latch bolt, knob mechanism including independent inner and outer hubs for retracting said latch bolt, and means for dogging the outer hub automatically on the closing of the door, said latch bolt freely retractable by said inner hub at all times; substantially as described.

In witness whereof, I have hereunto set my hand on the 28th day of December, 1912.

JOHN H. SHAW.

Witnesses:
WM. H. KIRSCHNER,
BERTHA RAY.

Copies of this patent may be obtained for five cents each, by addressing the "Commissioner of Patents, Washington, D. C."